United States Patent [19]
LeFebvre et al.

[11] Patent Number: 5,659,476
[45] Date of Patent: Aug. 19, 1997

[54] LAND VEHICLE NAVIGATION APPARATUS AND METHOD FOR PLANNING A RECOVERY ROUTE

[75] Inventors: Rebecca K. LeFebvre, Buffalo Grove; Joseph W. Seda, Wheeling; Kenneth B. Hohl, La Grange, all of Ill.

[73] Assignee: Motorola Inc., Schaumburg, Ill.

[21] Appl. No.: 362,363

[22] Filed: Dec. 22, 1994

[51] Int. Cl.$^6$ .............................. G01C 21/00; G06G 7/78
[52] U.S. Cl. ........................... 364/444.1; 364/449.4
[58] Field of Search ......................... 364/424.02, 443, 364/444, 449; 73/178 R

[56] References Cited

U.S. PATENT DOCUMENTS

| | | | |
|---|---|---|---|
| 4,888,699 | 12/1989 | Knoll et al. | 364/449 |
| 4,984,168 | 1/1991 | Neukrichner et al. | 364/449 |
| 5,177,685 | 1/1993 | Davis et al. | 364/443 |
| 5,184,303 | 2/1993 | Link | 364/449 |
| 5,243,528 | 9/1993 | Lefebvre | 364/449 |
| 5,262,775 | 11/1993 | Tamai et al. | 340/995 |
| 5,291,413 | 3/1994 | Tamai et al. | 364/449 |
| 5,291,414 | 3/1994 | Tamai et al. | 364/449 |
| 5,303,159 | 4/1994 | Tamai et al. | 364/449 |

*Primary Examiner*—Collin W. Park
*Attorney, Agent, or Firm*—Michael L. Smith

[57] ABSTRACT

An improved land vehicle navigation apparatus (10) and method for automatically planning a recovery route upon detection of a route departure. The land vehicle navigation apparatus (10) comprises a route planner (22) for planning an original route (88) for the land vehicle (2), via fixed road paths, wherein the original route includes multiple route segments, a start location, and at least one destination, including an original destination, and a position determiner (14) for determining an estimated current position of the land vehicle (2) and route storage for storing the original route segments into memory (24). The improvement comprises an automatic recovery route planner (56) for automatically planning a recovery route to the original route (88) upon detecting a route departure using recovery route planning criteria including designating at least some of the stored original route segments as a destination thereby eliminating the need for planning a completely new route and reducing recovery route planning time.

17 Claims, 6 Drawing Sheets

LAND VEHICLE NAVIGATION APPARATUS AND METHOD FOR PLANNING A RECOVERY ROUTE

FIELD OF THE INVENTION

The present invention relates to the field of land vehicle navigation. More specifically, the present invention relates to a type of land vehicle navigation recovery route planning that automatically plans a recovery route upon detection of a route departure using multiple destinations in order to more quickly plan a recovery route.

BACKGROUND OF THE INVENTION

Prior art land vehicle navigation apparatuses for planning a new or recovery route after departure from the original route use several different methods of recovery route planning. The first and most simple method is to simply advise the user he is off-route but provide no advice on how to get back to the original route nor provide information on how to get from the current land vehicle location to the original destination. A second slightly more sophisticated method is that the system advises the user that she is off-route and then waits for the user to make some input into the system to initiate recovery, such as requesting the user to press a "replan" button. In addition, the user could choose to cancel the route or drive without the use of the navigation apparatus. If the user were to return to the planned route at some point the navigation apparatus would detect this and resume providing route guidance. As those skilled in the art will realize, requiring user input may be difficult to perform while driving.

A third still more sophisticated prior art method detects the off-route condition and automatically replans an entirely new route from the current vehicle location to the original destination. A fourth method automatically replans a recovery route from the current vehicle location back to the point of route departure.

As can be seen the first and second methods of the prior art are simple and do not automatically plan a recovery route but instead either give no advice or wait for user input before taking any recovery action. The third and fourth methods while providing for automatic recovery route planning either take substantial amount of time or plan significantly inconvenient recovery routes.

For example, the third method described above replans an entirely new route from the current vehicle location to the original destination and even given a very fast route planner a land vehicle navigation system can still take over 30 seconds to plan a new route. In this amount of time the user may have already passed a necessary turn-off or fork in the road along the newly planned route. Therefore, there is a need to have a route planner system automatically plan a recovery route in a very short amount of time, after detecting a route departure to ensure that the user does not miss any necessary turns. This is particularly true because the route departure occurs while driving and the vehicle is therefore in motion at the time that recovery guidance is needed. A lag on the order of thirty seconds is simply too long to wait while a vehicle is in motion and a driver is waiting for recovery instructions. If the driver is in unfamiliar territory he would not necessarily know where to go while waiting for a recovery route to be planned and, in fact, may drive to a point off the replanned route thereby requiring another entirely new route to be planned. Obviously, it is also undesirable for the user to be required to stop the car and wait for the route plan to be completed. This would require pulling off on the shoulder of the road or into a parking lot which may be impractical, dangerous, or illegal.

The principal drawback of the fourth approach is that it tends to give a non-optimal route and often requires a lot of backtracking to get back to the point of route departure. This results in a loss of time and an unnecessary amount of driving. For example, if a driver took the wrong exit from a highway, the point of route departure is the segment of highway right before the exit. To return to this segment may require several miles of driving back in the direction of the trip origin to get back on the highway. Using this system the user is guided in the direction back to the point from which he left even though there may be an entrance directly ahead that puts him back on the correct highway and carries the user towards his intended destination.

BRIEF DESCRIPTION OF THE DRAWINGS

For a more complete understanding of the invention, reference should be made to the drawings, in which.

DESCRIPTION OF THE PREFERRED EMBODIMENTS

A land vehicle navigation apparatus for automatically planning a recovery route upon detection of a route departure is provided. The land vehicle navigation apparatus comprises a route planner for planning an original route for the land vehicle, via fixed road paths, wherein the original route includes multiple route segments, a start location, and at least one destination, including an original destination. In addition, a position determiner for determining an estimated current position of the land vehicle and route storage for storing the original route segments into memory is included. The improvement comprises an automatic recovery route planner for automatically planning a recovery route to the original route upon detecting a route departure using recovery route planning criteria including designating at least some of the stored original route segments as a destination thereby eliminating the need for planning a completely new route and reducing recovery route planning time.

Figure 1:
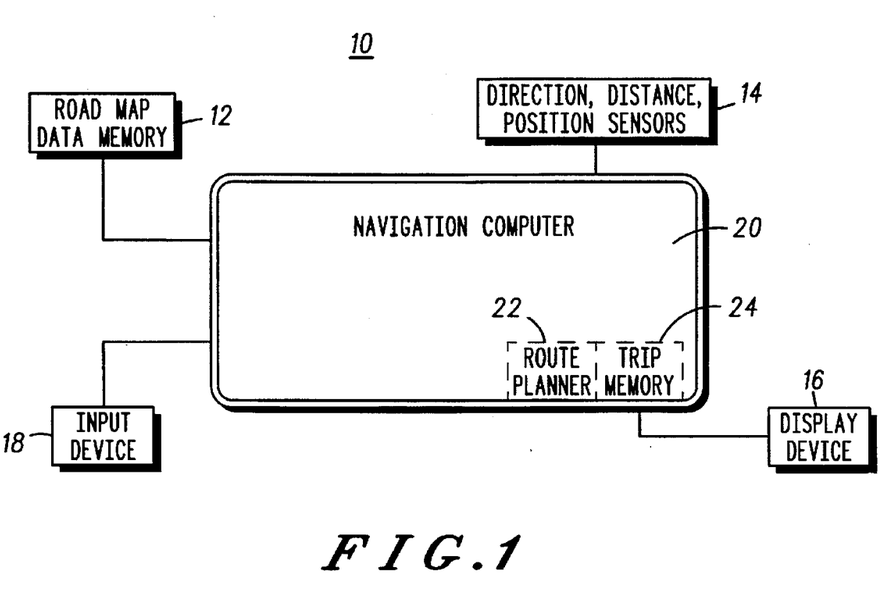
FIG. 1 is a schematic diagram of a land vehicle navigation apparatus in accordance with the present invention.

Referring now to FIG. 1, there is shown a land vehicle apparatus 10 in accordance with the present invention. The land vehicle apparatus 10 includes a road map data memory 12, direction, distance, and position sensors 14, a display device 16, and an input device 18 all connected to a navigation computer 20. The computer 20, preferably containing a microprocessor or other similar type of computer, further includes a route planner 22 for planning routes for the land vehicle via fixed road paths between a start location and at least one destination. The computer 20 also includes a trip memory 24 that provides route storage for storing planned routes, as well as events that occurred during travel along the planned route. As those skilled in the art are well aware, the computer 20 plans a navigation route based on input commands from device 18. This navigation route will be via fixed road paths which are defined by a road map stored in memory 12. This road map data can be stored on a compact disc which is loaded into navigation computer 20 for particular geographical areas, or the data can be received dynamically as the vehicle travels into different geographical areas via communications such as a cellular phone.

The sensors 14 essentially provide vehicle direction information through the use of such sensors as a compass and a differential odometer and collectively form a position determiner. Such direction sensors are known and used in prior navigation systems either alone or in combination. In addition, the sensors 14 may include wheel travel distance sensors and position sensors such as global positioning system (GPS) receivers which provide precise vehicle position location information. If GPS position sensors are not used then the navigation computer 20 may use dead reckoning navigation computations based on distance travel and vehicle direction. The implementation of dead reckoning position computations by navigation systems is very well known. After receiving commands from the input device 18, the road map data from memory 12, and sensor data from the sensors 14, the navigation computer 20 computes the desired navigation route between present vehicle location and the desired destination location specified by the user through the input device 18.

The navigation computer 20 then preferably provides both audio and visual navigation instructions through display device 16 to guide the vehicle operator along the calculated route. The timing for these maneuver instructions is coordinated with the navigation computer 20 determining an estimated current position of the vehicle either by dead reckoning determination, as described above, or by use of a GPS position receiver. A navigation system such as the system 10 described above are well known and many such systems are described in prior technical articles.

During travel along a navigation route, especially a long route, it is common that the user will go off-route, that is depart from the planned route. When such a route departure occurs the user may need or want guidance from the navigation system 10 as to how to recover from the route departure and get back on the pre-planned route. As mentioned above, prior art systems have provided varying levels of assistance to the user over a range from no assistance to planning an entirely new route. Obviously, it is desirable to provide some assistance to the user, as she may be in an unfamiliar area and not know how to recover from her route departure to get back on a route to the original destination.

In those prior art systems that have provided the user with assistance to get back on route after route departure the most common method has been to plan a new route from the current vehicle location to the original destination. The main problem with this approach is that the user is most likely driving with the vehicle in motion and therefore the vehicle location is constantly changing. This then necessarily means that the new route plan must be planned in a very short time to provide an accurate recovery route where the vehicle location is constantly changing. However, even given a very fast route planner the system may still take on the order of 30 seconds to plan a new route. In this amount of time the driver in the vehicle may have moved past a necessary turn on the newly planned route. This in turn would mean the user is again off-route and require planning yet another route with the possibility of the same defect arising again. Obviously, it is undesirable and perhaps even dangerous for a user to have to stop the car and wait for the route to be re-planned. This is because the user may be on an interstate where stopping is inconvenient or illegal or possibly the user is in an undesirable location that may be dangerous. As mentioned above, another approach used in the prior art has been to plan a recovery route from the current vehicle location to the point at which the vehicle left the route. This has the undesirable effect of making the user backtrack a distance from the current location to the point of route departure.

The present invention substantially solves the shortcomings of the prior art as described in detail below.

Figure 2:
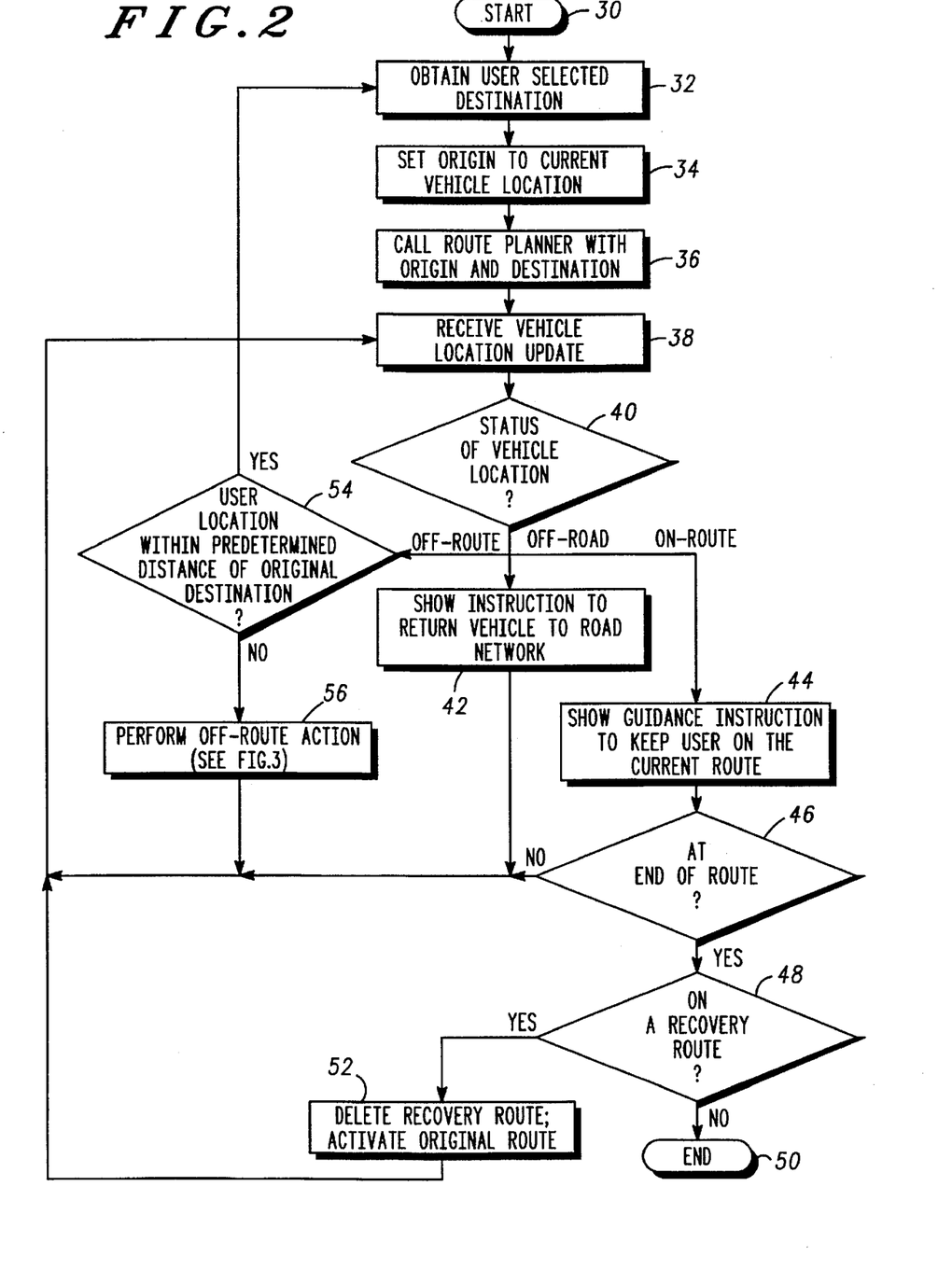
FIG. 2 is a flow chart illustrating the overall operation of a vehicle route guidance system in accordance with the present invention.

Referring to FIG. 2 there is shown a flow chart that sets forth the broad guidance and navigation system according to the present invention. The flow chart is entered at start point 30 and proceeds to block 32 where the user selected destination, also referred to as the original destination is obtained by the navigation computer 20 from trip memory 24 where the original destination is stored. Next, block 34 sets the origin of the route to the current vehicle location.

Block 36 then causes the navigation computer 20 to call the route planner 22 with the origin and destinations as set in blocks 32 and 34. The route planning of block 36 is performed using well known shortest path algorithms using map data stored in road map data memory 12.

Block 38 then receives vehicle location updates from sensors 14 in order to track the current vehicle location. Through the use of known map matching techniques, inputs from position sensors 14 can be converted to a road segment identifier, representing the current location of the vehicle. This identifier is then compared with road segment identifiers within the planned route to determine the vehicle position. This comparison then provides a determination of whether the vehicle is on-route, off-route, or off-road.

After the origin and destinations have been set, the route planned, and the vehicle location updates received the system 10, at decision block 40, now determines the status of the vehicle location. One of three possible conditions exist: off-road, on-route, or off-route. The off-road condition indicates that the current vehicle location is at a place where the vehicle is not on the road network stored in the road map data memory 12. This could be where the vehicle is in a parking lot or a field or outside of the road map data coverage area. If an off-road condition is determined in decision block 40 block, block 42 shows instructions to the user, through display device 16, to return the vehicle to the road network and the flow chart then loops back to block 38 to receive a vehicle location update.

The on-route condition indicates that the vehicle is on the route planned at block 36 and the flow chart proceeds to block 44, which shows guidance instructions to keep the user on the current route by displaying these instructions on display device 16 and/or giving audible instructions to the user. The system then proceeds to decision block 46 to determine if the vehicle is at the end of the route. If the decision at block 46 is no, the program loops back to block 38. If at decision block 46 it is determined that the user is at the end of a route decision block 48 determines if the user is on a recovery route. If the decision at block 48 is no, the program is ended at 50. However, if the user is on a recovery route, block 52 then deletes the recovery route and activates the original route to provide the user with guidance to his original destination and the program loops back to block 38.

An off-route condition indicates that the user is on a road within the road map data memory 12, but has left the planned route for some reason. If decision block 40 determines that the user is off-route the program proceeds to decision block 54, which determines if the user location is within a predetermined distance of the original destination. Decision block 54 is preferably included because if the user is sufficiently close to the original destination it may be more efficient and faster to plan a new route to the original destination than to plan a recovery route as described below. As those skilled in the art will appreciate, the distance used in making the decision at block 54 will vary depending on where the user is traveling, e.g. the more urban the area the shorter the predetermined distance will be Therefore, if the answer to decision block 54 is yes, the program loops back to block 32 in order to plan a new route. However, if the answer to decision block 54 is no, the program proceeds to block 56 to perform the off-route action, as described in detail below with respect to FIG. 3.

Figure 3:
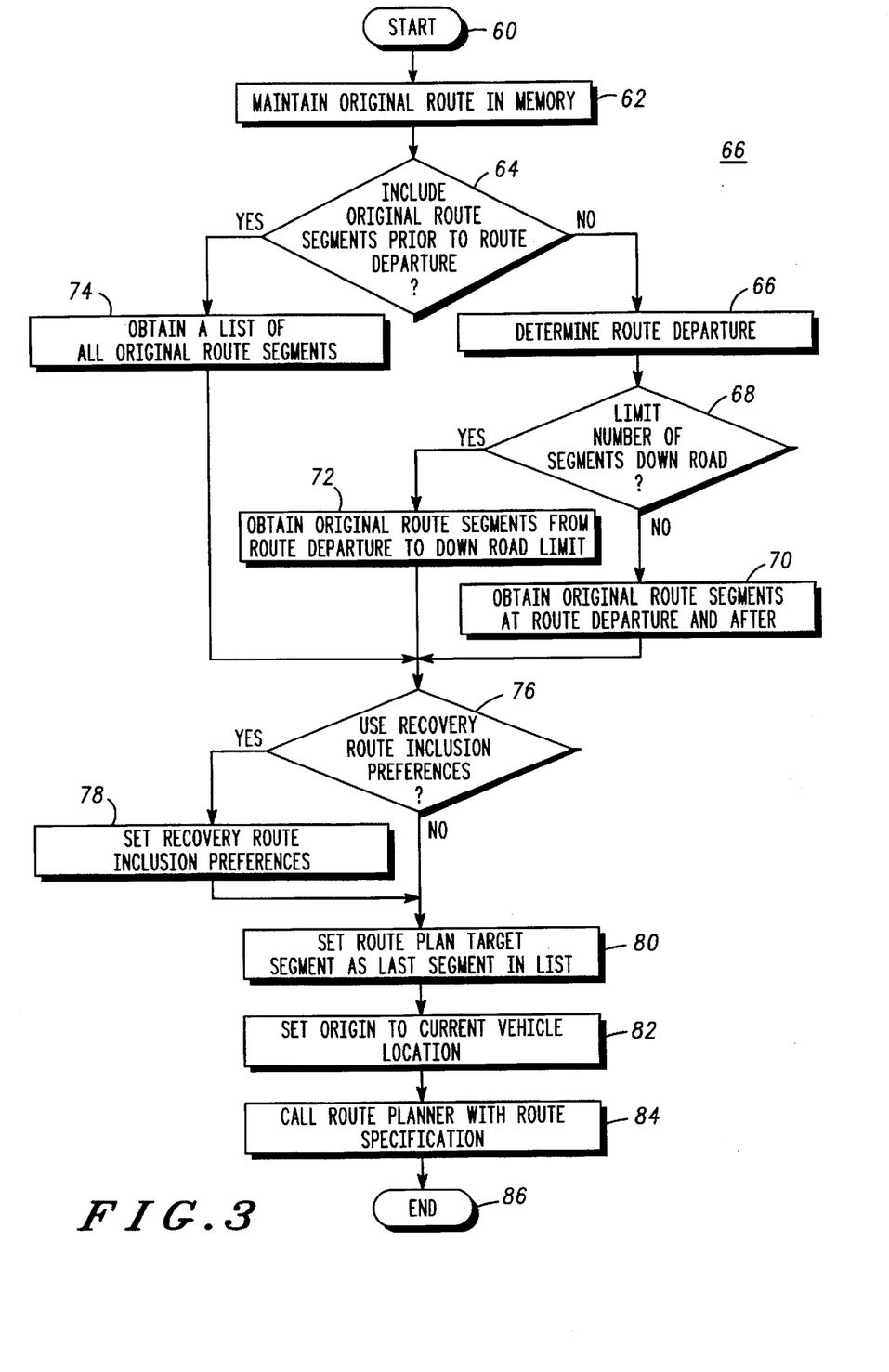
FIG. 3 is a more detailed flow chart of a portion of FIG. 2.

Referring now to FIG. 3, there is disclosed a flow chart setting forth several preferred methods of planning a recovery route. Each preferred method is slightly different based on which original route segments are used in planning the recovery route. As those skilled in the art will appreciate, the recovery route planned will depend on the capabilities of the land vehicle apparatus 10 and will attempt to balance route quality (quality of roads, travel time, etc.) and performance of the apparatus 10 (planning speed, memory usage, etc.).

The recovery route planning block 56 of FIG. 2 begins in FIG. 3 at starting point 60. The program then proceeds to block 62 which maintains the original route in memory 24. Next, decision block 64 determines if the original route segments prior to route departure are to be included in the recovery route planning. Making the decision of decision block 64 is important and preferred because depending on the user preference and the type of route that was originally planned it may be advantageous to exclude original route segments from the recovery route planning prior to the route departure. This is because after a route departure if all the original route segments were to be included the recovery route may be planned such that the user is returned to a route segment before the route departure, in other words the user may be forced to back track when the user would rather continue on towards the original destination. Also, the user may have made a route departure because of some undesirable route condition such as road construction or a traffic accident and by including route segments prior to the route departure the user may be led back to the route condition she was trying to avoid.

However, excluding original route segments prior to the route departure may not be possible. The route planner 22 may need to include route segments prior to the route departure in the planned recovery route. An example would be where one of the prior segments was a bridge over a body of water and there are no other bridges in the area. If the bridge segment were excluded from the recovery route plan it might not be possible to plan a recovery route back to the original route without traveling far off track.

If the decision is made at decision block 64 that no original segments prior to the route departure are to be included block 66 determines the route departure of the vehicle, i.e., the point at which the vehicle went off-route. Decision block 68 then determines whether the route planner 22 should limit the number of segments downroad from the route departure point to be included in the recovery route planning. This decision is determined by, among other factors, the proximity of the vehicle to the original destination. If the vehicle is more than a predetermined distance from the original destination then the route planner 22 will limit the number of segments downroad from the route departure that are included in the recovery route planning. As those skilled in the art will appreciate, including all the original segments in the recovery route plan will generally produce the optimal recovery route. However, the more downroad segments that are included the greater the recovery route planning time required. Choosing the correct number of down road segments requires balancing route quality with planning time.

Therefore, if the recovery route planning is not to limit the number of segments downroad, block 70 obtains the original route segments at the route departure point and after to be used in planning a recovery route back to the original route. However, if at decision block 68 it is determined that the number of original route segments downroad is to be limited, block 72 obtains the original route segments from the route departure point to the downroad limit, which is some predetermined distance from the route departure. Referring back to decision block 64, if it is determined that the original route segments prior to departure are to be included block 74 obtains a list of all original route segments.

After blocks 70, 72, or 74 decision block 76 determines if the recovery route planning is to use recovery route inclusion preferences. These recovery route inclusion preferences refer to a weighting of route segments before and/or after the route departure in order to indicate to the route planner 22 the segments to which it is more desirable to plan a recovery route. These route inclusion preferences include designating an impedance or some other weighting factor for original route segments before the route departure and immediately after the route departure as the least preferred segments to which to plan a recovery route. For example, a high impedance value may be given to route segments before the route departure and immediately after the route departure and ramped down to lower impedance values at some predetermined rate. This encourages the route planner 22 to plan a recovery route further downroad from the route departure and more towards the original destination than it might otherwise plan, if no recovery route inclusion preferences were used.

If at decision block 76 it is determined that recovery route inclusion preferences are to be used, block 78 sets the recovery route inclusion preferences. After block 78 or if at block 76 it is determined that the recovery route inclusion preferences are not to be used block 80 sets the recovery route plan target segment as the last segment in the list. This segment could be the original destination or it may be the last segment included downroad from the route departure that was limited at decision block 68 and block 72. Block 82 then sets the origin to the current vehicle location and block 84 calls the route planner 22 with the route specification as determined by the various decisions made as described above and with respect to FIG. 3. The program is then ended at block 86.

As can be seen from the above discussion an important advantage of the present invention over the prior art is that multiple route segments are used as a target rather than only one segment. This has the significant advantage of using route planning already completed in the original route plan to reduce the amount of recovery route planning needed to be done. This is because if the route planner 22 can plan a route to one of several route segments the likelihood is that the recovery route will be planned significantly faster than if a new route were planned to the original destination. This can reduce the recovery route planning time from 30 seconds or more to approximately five seconds.

This in turn allows the user to continue driving after route departure and enable the route planner 22 to plan a recovery route in a sufficiently quick and timely manner. As those skilled in the art will appreciate, this greatly enhances the safety and effectiveness of the navigation system by not making the user slow down, pull off to the side of the road, or drive aimlessly while waiting for the route planner 22 to plan a new route the original destination.

FIGS. 4–9 show an original route plan 88 having multiple route segments, in this case five segments A, B, C, D, and E respectively. The six FIGS. 4–9 disclose different recovery route plans back to the original route 88, based on the different recovery route planning criteria used in the flow chart of FIG. 3. The original route 88 is set forth as a single solid line with segment A being the original start location segment and segment E being the original destination segment. As explained below each FIG. 4–9 represents the use of a different predetermined number of original route segments in the recovery route planning.

Figure 4:
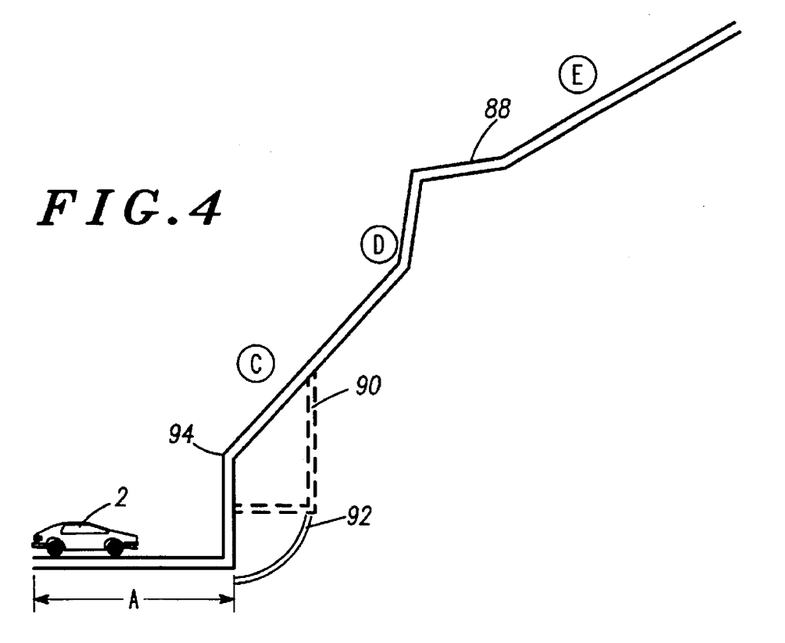
FIG. 4 is a graphic illustration of an original route with possible recovery routes planned in accordance with one embodiment of the present invention.

FIG. 4 discloses two possible recovery route plans 90 and 92 for vehicle 2, designated as a dashed line and a double solid line respectively. After route departure point 94 is detected. The recovery route procedure, as set forth and explained above with respect to FIG. 3, is performed. In the example of FIG. 4 all of the original route 88 segments A–E are obtained at block 74 and no recovery route inclusion preferences, i.e. no weighting are used. This set of recovery route criteria could yield either of the two exemplary recovery routes 90 and 92. The difference between these two paths 90 and 92 depends on the weights of the segments representing the road network. Segment weights are a function of the time to traverse the segment and the distance of the segment.

Because no recovery route inclusion preferences were set and all of the original route 88 segments A–E were included in the recovery plan the route planner 22 may plan a route such as recovery route 90 which leads the user back on to the original route from route departure 94 very quickly and to a point towards the destination, as shown. This has a possible disadvantage in that the recovery route 90 may lead the user back to the original route 88 at a point before the user may desire to get back on the original route 88. The user may not wish to get back on the original route 88 quickly because she has left the original route 88 because of road construction or an accident or some other obstruction in the road that prevents her timely movement towards the original destination.

Also, because all of the original route segments A–E were used and no weighting was given to any of the segments the route planner 22 may plan a recovery route such as recovery route 92 which would result in undesired backtracking from route departure 94 to a point on the original route 88 prior to route departure 94. Obviously, this is an undesirable result if there are other recovery route options that lead the user towards the original destination. However, in a rural area the only convenient recovery route may require some backtracking, as shown in recovery route 92 where the recovery route options are extremely limited.

Figure 5:
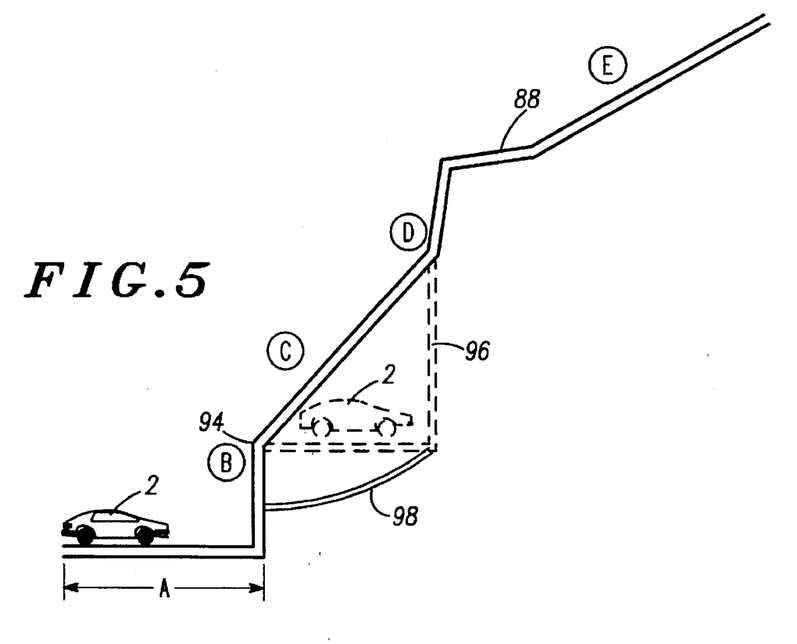
FIG. 5 is a graphic illustration of recovery route planning in accordance with another embodiment of the present invention.

Referring now to FIG. 5, two possible recovery routes 96 and 98 are shown. The criteria used includes original route segments before route departure 94 and setting recovery route inclusion preferences. With reference to FIG. 3, recovery routes 96 and 98 are exemplary recovery routes utilizing a preferred embodiment where the answers to decision blocks 64 and 76 are both yes. One possible set of recovery route inclusion preferences of block 78 would be where the impedance values of segments A and B before the route departure 94 are normal, segment C is twice normal, segment D is 1.5 times normal, and segment E is normal. With these given recovery route inclusion preferences it is possible that the route planner 22 would plan a recovery route 96 to segment D because segment D is preferred over segment C. This has the advantage of influencing the route planner 22 to guide the user back to the original route 88 at a point further down-road from route departure 94 than if no recovery route inclusion preferences were used, which may avoid undesirable road conditions immediately after route departure 94.

However, the possibility still exists that backtracking may occur. This is because the segments before route departure 94 are included and therefore recovery route 98 might be planned.

Figure 6:
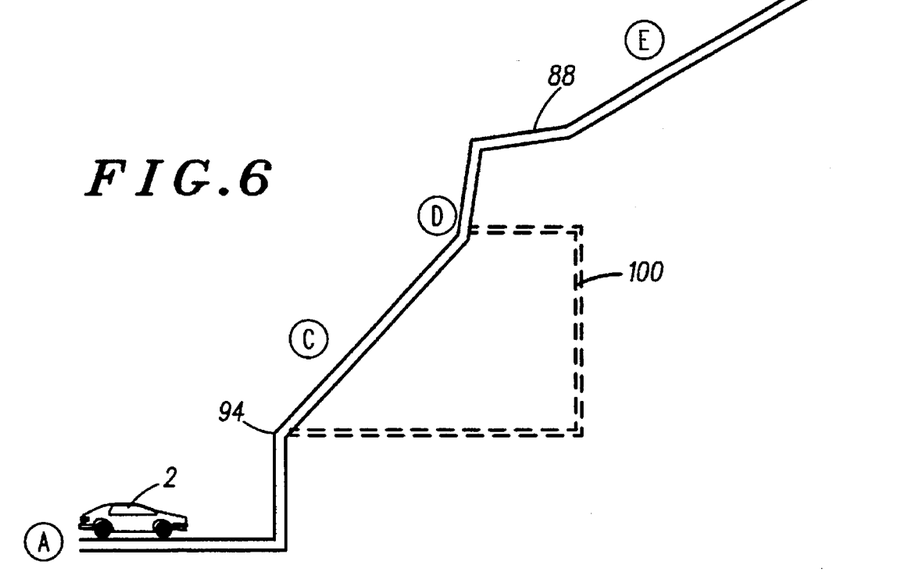
FIG. 6 is a graphic illustration of recovery route planning in accordance with yet another embodiment of the present invention.

FIG. 6 discloses the example where only the route segments C, D, and E after route departure 94 are obtained for use in the recovery route planning (decision at block 64 of FIG. 3 is no). Also, in this example no weighting or recovery route inclusion preferences are given (decision at block 76 is no). This could result in recovery route 100 being planned where the recovery route 100 leads the user back to the original route 88 very quickly. This particular example eliminates the possibility of backtracking because the original route segments before route departure 94 are not included in the recovery route plan. This option is useful in a more urban area where it is known that recovery routes can be planned without the need to backtrack. However, as explained above this may not be desirable in all instances. Also, if the user left the original route because of an accident the recovery route 100 may be undesirable because it may guide the user back to the problem on the original route 88 that the user was trying to avoid.

Figure 7:
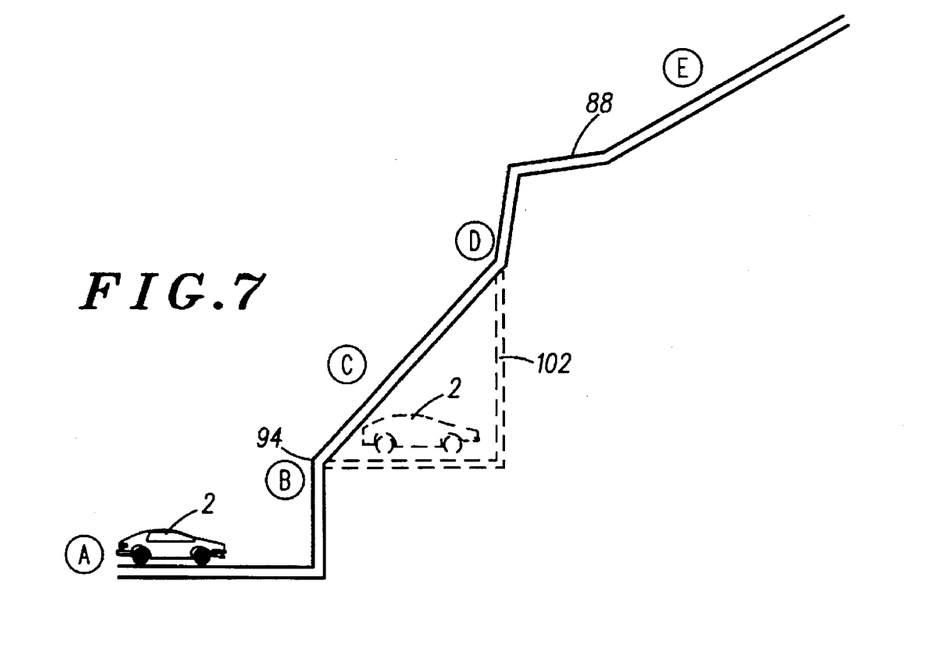
FIG. 7 is a graphic illustration of recovery route planning in accordance with still another embodiment of present invention.

Therefore, recovery route planning criteria such as shown in FIG. 7 may be more desirable. FIG. 7 shows an example where only the route segments C, D, and E after route departure 94 are included in the recovery route plan as well as the use of recovery route inclusion preferences. Using these criteria a recovery route may lead the vehicle 2 on a recovery route such as shown at 102. Recovery route 102 would likely guide the vehicle 2 to the original route 88 at a point further towards the original destination and possibly away from undesired conditions on the original route 88 than using the recovery route planning criteria of FIG. 6.

Figure 8:
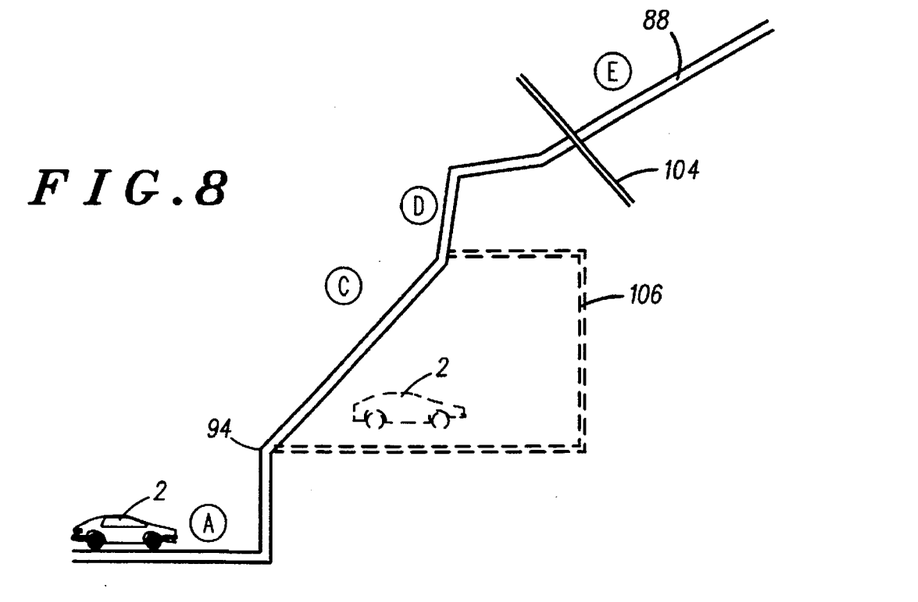
FIG. 8 is a graphic illustration of recovery route planning in accordance with yet another embodiment of present invention.
Figure 9:
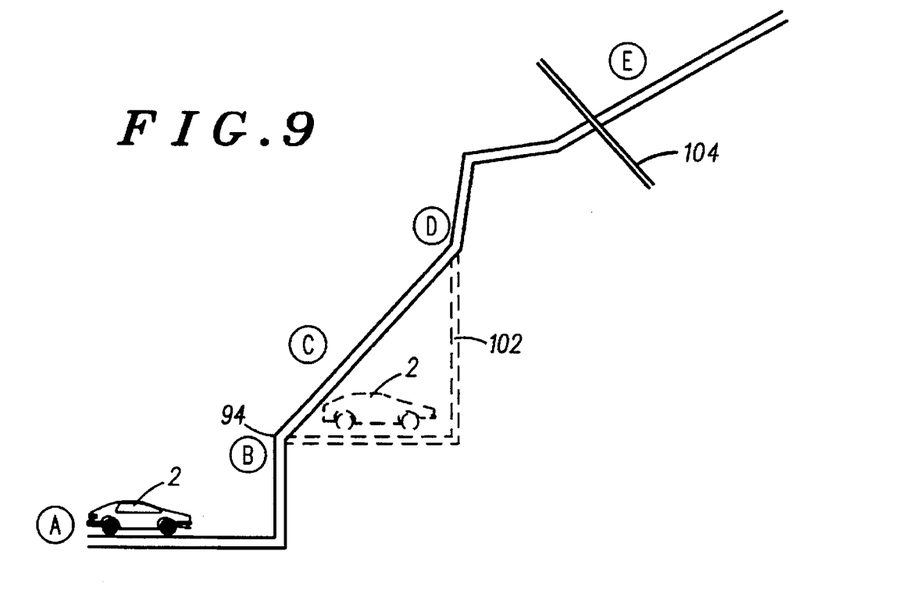
FIG. 9 is another illustration of recovery route planning in accordance with another embodiment of the present invention.

FIG. 8 discloses an example of where the route segments A and B before route departure 94 are not included in the recovery route planning and the segments C, D, and E after route departure 94 are limited to a predetermined distance downroad (decision at block 68 of FIG. 3 is yes) from route departure 94 as indicated by line 104. Using this particular set of recovery route planning criteria is advantageous because by limiting the distance of original route segments after the route departure 94 to a predetermined relatively small distance the recovery route 106 can be planned very quickly. This is because a relatively small area in this example only segments C, D, and a portion of segment E are used as target segments in the recovery route plan. This, however, may lead to a recovery route that leads the vehicle 2 back to the original route 88 too quickly as explained above.

FIG. 9 is an example where only the original segments C, D, and E after route departure 94 are used to a predetermined distance after route departure 94, and the original route segments C, D, and E are given recovery route inclusion preferences such as described above and as shown in FIG. 9. This set of recovery route planning criteria has the advantage of preventing backtracking and encouraging the recovery route to be planned to guide the vehicle 2 back to the original route 88 at a point further from route departure 94 than might otherwise be planned. Also, by limiting the amount of original route segments to be used in a recovery route, the recovery route planning time can be reduced even further.

We claim:

1. An improved land vehicle navigation apparatus for automatically planning a recovery route upon detection of a route departure comprising:

route planner for planning an original route for a land vehicle, via fixed road paths, wherein the original route includes multiple route segments, a start location, and at least one destination location including an original destination location;

position determiner for determining an estimated current position of the land vehicle;

route storage for storing the original route segments in a memory; and wherein the improvement comprises, a recovery route planner for automatically planning a recovery route, when the vehicle is not within a predetermined distance of the original destination location, to the original route upon detecting a route departure with the route planner using recovery route planning criteria including designating at least some of stored original route segments as a destination location thereby eliminating the need for planning a completely new route and reducing recovery route planning time; and wherein the recovery route planner uses additional recovery route planning criteria wherein the stored original route segments are weighted such that lower recovery route inclusion preferences are given to original route segments immediately following the route departure as compared to original route segments further from the route departure thereby helping to avoid possible undesired original route; conditions after the route departure.

2. The land vehicle navigation apparatus of claim 1 wherein the recovery route inclusion preference weighting is progressively increased for successive original segments after the route departure.

3. The land vehicle navigation apparatus of claim 1 wherein a predetermined number of original route segments are given a lower weighted recovery route inclusion preference.

4. The land vehicle navigation apparatus of claim 1 wherein the recovery route inclusion preference includes giving each original route segment a particular impedance value whereby the higher the impedance value the lower the recovery route inclusion preference.

5. The land vehicle navigation apparatus of claim 1 further including using additional recovery route planning criteria wherein the original route includes a last route segment and wherein the last route segment is designated as a target segment thereby causing the recovery route to be planned toward the target segment.

6. The land vehicle navigation apparatus of claim 1 wherein the destination location includes all of the original route segments.

7. The land vehicle navigation apparatus of claim 1 further including using additional recovery route planning criteria wherein only a predetermined number of original route segments or positions thereof after the route departure are included as destinations thereby limiting the number of potential recovery routes and reducing recovery route planning time.

8. The land vehicle navigation apparatus of claim 7 wherein a last one of the included predetermined number of original route segments is designated as a target segment thereby causing the recovery route to be planned toward the target segment.

9. An improved land vehicle navigation apparatus for planning a recovery route upon detection of a route departure comprising:

route calculation means for calculating an original route for a vehicle, via fixed road paths, wherein the original route includes multiple route segments, a start location, and at least one destination location;

position determining means for determining an estimated current position of the vehicle;

route storage areas for storing the original route segments in a memory; and wherein the improvement comprises, recovery route planning means for planning recovery route to the original route after detecting a route departure by using recovery route planning criteria including, using at least some of the stored original route segments as a destination location thereby eliminating the need for planning a completely new route and reducing recovery route planning time;

weighting the stored original route segments such that lower recovery route inclusion preference weightings are given to original route segments immediately after the route departure relative to original route segments further from the route departure and wherein the recovery route inclusion preference weighting is progressively increased for successive original route segments after the route departure thereby helping to avoid possible undesired original route conditions after the route departure; and designating a last route segment as a target segment thereby causing the recovery route to be planned toward the target segment.

10. The land vehicle navigation apparatus of claim 9 wherein a predetermined number of original route segments are given lower weighted recovery route inclusion preferences.

11. The land vehicle navigation apparatus of claim 9 wherein the recovery route inclusion preference includes giving each original route segment a particular impedance value whereby the higher the impedance value the lower the recovery route inclusion preference.

12. The land vehicle navigation apparatus of claim 9 wherein the destination location includes all of the original route segments.

13. The land vehicle navigation apparatus of claim 9 wherein the destination location includes a predetermined number of original route segments after the route departure.

14. In an improved method for automatically planning a recovery route for a land vehicle upon detection of a route departure of the type wherein an original route via fixed road paths is calculated with a navigation computer such that the original route includes multiple route segments, a start location, and at least one destination location and determining an estimated current position of the land vehicle and storing the original route segments in a memory associated with the navigation computer, the improvement comprising:

- automatically planning a recovery route to the original route upon detecting a route departure using recovery route planning criteria including designating at least some of the stored original route segments as a destination location thereby eliminating the need for planning a completely new route and reducing recovery route planning time; and
- weighting the stored original route segments such that lower recovery route inclusion preferences are given to original route segments immediately following the route departure relative to original route segments further from the route departure thereby helping to avoid possible undesired original route conditions after the route departure.

15. The method of claim 14, the improvement further comprising progressively increasing the recovery route inclusion preference weighting for successive original route segments after the route departure.

16. The method of claim 14, the improvement further comprising giving each original route segment a particular impedance value wherein the higher the impedance value the lower the recovery route inclusion preference.

17. The method of claim 14, the improvement further comprising the steps of:

- designating a predetermined number of original route segments or portions thereof including a last original route segment or segment portion furthest from the route departure after the route departure as destinations thereby limiting the number of potential recovery routes and reducing recovery route planning time; and
- designating the last original route segment or segment portion as a target segment thereby causing the recovery route to be planned toward the target segment.

* * * * *